US009410042B2

(12) United States Patent
Chavan et al.

(10) Patent No.: US 9,410,042 B2
(45) Date of Patent: Aug. 9, 2016

(54) PROCESS FOR OBTAINING CARBON BLACK POWDER WITH REDUCED SULFUR CONTENT

(71) Applicant: Aditya Birla Science and Technology Company Ltd., Mumbai, Maharashtra (IN)

(72) Inventors: Sandeep Vasant Chavan, Mumbai (IN); Harshad Ravindra Kini, Mumbai (IN); Shobhit Gupta, New Delhi (IN)

(73) Assignee: Aditya Birla Science and Technology Company Ltd., Mumbai (IN)

( * ) Notice: Subject to any disclaimer, the term of this patent is extended or adjusted under 35 U.S.C. 154(b) by 0 days.

(21) Appl. No.: 14/389,438

(22) PCT Filed: Mar. 28, 2013

(86) PCT No.: PCT/IN2013/000208
§ 371 (c)(1),
(2) Date: Sep. 30, 2014

(87) PCT Pub. No.: WO2013/175488
PCT Pub. Date: Nov. 28, 2013

(65) Prior Publication Data
US 2015/0056127 A1    Feb. 26, 2015

(30) Foreign Application Priority Data
Mar. 30, 2012 (IN) .......................... 1018/MUM2012

(51) Int. Cl.
C09C 1/56        (2006.01)
C09C 1/48        (2006.01)
(52) U.S. Cl.
CPC ... C09C 1/56 (2013.01); C09C 1/48 (2013.01); C01P 2002/88 (2013.01); C01P 2006/80 (2013.01)
(58) Field of Classification Search
CPC ........................................................ C09C 1/56
See application file for complete search history.

(56) References Cited

U.S. PATENT DOCUMENTS

| | | |
|---|---|---|
| 1,938,672 A | 12/1933 | Ruthruff |
| 1,952,616 A | 3/1934 | Vose |
| 2,436,550 A | 2/1948 | Brandon |
| 2,486,519 A | 11/1949 | Chenicek |
| 2,516,877 A | 8/1950 | Horne et al. |
| 2,537,756 A | 1/1951 | Heinemann |
| 2,604,436 A | 7/1952 | Adey et al. |
| 2,623,004 A | 12/1952 | Shalit |
| 2,634,230 A | 4/1953 | Arnold et al. |
| 2,640,011 A | 5/1953 | Mason et al. |
| 2,697,682 A | 12/1954 | Porter |
| 2,811,502 A | 10/1957 | Gessler et al. |
| 2,866,751 A | 12/1958 | Zimmerschied et al. |
| 2,866,752 A | 12/1958 | Zimmerschied et al. |
| 2,902,441 A | 9/1959 | May et al. |
| 2,911,359 A | 11/1959 | Hansford |
| 2,988,499 A | 6/1961 | Kenny |
| 2,992,182 A | 7/1961 | Flzinga et al. |
| 3,004,912 A | 10/1961 | Kaneko et al. |
| 3,093,575 A | 6/1963 | Kimberlin, Jr. et al. |
| 3,163,593 A | 12/1964 | Webster et al. |
| 3,165,378 A | 1/1965 | Greenawalt |
| 3,320,157 A | 5/1967 | Arey, Jr. et al. |
| 3,340,081 A | 9/1967 | Teter |
| 3,413,307 A | 11/1968 | Heimlich et al. |
| 3,442,679 A | 5/1969 | Rivin et al. |
| 3,505,210 A | 4/1970 | Wallace et al. |
| 3,528,840 A | 9/1970 | Aboytes |
| 3,565,792 A | 2/1971 | Haskett |
| 3,617,530 A | 11/1971 | Rieve et al. |
| 3,620,968 A | 11/1971 | Bridge et al. |
| 3,620,969 A | 11/1971 | Tumock et al. |
| 3,657,064 A | 4/1972 | Shick |
| 3,668,116 A | 6/1972 | Adams et al. |
| 3,698,860 A | 10/1972 | Shiba |
| 3,755,149 A | 8/1973 | Kohn |
| 3,779,895 A | 12/1973 | Wilson et al. |
| 3,787,315 A | 1/1974 | Bearden, Jr. et al. |

(Continued)

FOREIGN PATENT DOCUMENTS

| | | |
|---|---|---|
| CN | 1330127 A | 1/2002 |
| CN | 1481335 A | 3/2004 |

(Continued)

OTHER PUBLICATIONS

First Office Action issued on Jul. 27, 2015 by the State Intellectual Property Office of the People's Republic of China for Chinese Patent Application No. 201380020228.0, which was filed on Mar. 28, 2013 and published as CN104334650 on Feb. 4, 2015 (Inventor—Chavan et al.; Applicant—Aditya Birla Science and Technology Co. Ltd.; (only translation provided) (9 pages).

International Search Report and Written Opinion mailed on Jan. 14, 2014 by the by the International Searching Authority for International Patent Application No. PCT/IN2013/000208, which was filed on Mar. 28, 2013 and published as WO 2013/175488 on Nov. 28, 2013 (Inventor—Chavan et al.; Applicant—Aditya Birla Science and Technology Co. Ltd.; (8 pages).

International Preliminary Report on Patentability issued Oct. 1, 2014 by the International Searching Authority for International Patent Application No. PCT/IN2013/000208, which was filed on Mar. 28, 2013 and published as WO 2013/175488 on Nov. 28, 2013 (Inventor—Chavan et al.; Applicant—Aditya Birla Science and Technology Co. Ltd.; (6 pages).

(Continued)

Primary Examiner — Stuart Hendrickson
(74) Attorney, Agent, or Firm — Ballard Spahr LLP

(57) ABSTRACT

The present disclosure relates to a process for obtaining carbon black powder with a sulfur content of less than 0.07%. The process includes step of reacting carbon black powder with a sulfur content of 1-2% with an alkali metal or salt thereof, in a fluid media, at a temperature in the range of 100° C. to 350° C. and pressure in the range of 10 to 500 psig. It is found that in accordance with the process of the present disclosure, the sulfur content was reduced substantially from that of about 1.25% to that of 0.05%, resulting in about 96% desulfurization.

12 Claims, No Drawings

(56) References Cited

U.S. PATENT DOCUMENTS

| | | |
|---|---|---|
| 3,816,301 A | 6/1974 | Sorgenti |
| 3,847,800 A | 11/1974 | Guth et al. |
| 4,003,824 A | 1/1977 | Baird, Jr. et al. |
| 4,076,613 A | 2/1978 | Bearden, Jr. |
| 4,119,528 A | 10/1978 | Baird, Jr. et al. |
| 4,120,779 A | 10/1978 | Baird, Jr. et al. |
| 4,123,350 A | 10/1978 | Baird, Jr. et al. |
| 4,147,612 A | 4/1979 | Miasek et al. |
| 4,193,864 A | 3/1980 | Chang |
| 4,248,695 A | 2/1981 | Swanson |
| 4,327,069 A | 4/1982 | Cheng |
| 4,328,127 A | 5/1982 | Angevine et al. |
| 4,419,224 A | 12/1983 | Miller et al. |
| 4,437,980 A | 3/1984 | Heredy et al. |
| 4,576,710 A | 3/1986 | Nongbri et al. |
| 4,695,366 A | 9/1987 | Miller et al. |
| 4,960,506 A | 10/1990 | Halbert et al. |
| 4,988,493 A | 1/1991 | Norman et al. |
| 5,219,542 A | 6/1993 | Lowery et al. |
| 5,310,717 A | 5/1994 | Delzer et al. |
| 5,677,259 A | 10/1997 | Yamase et al. |
| 5,935,421 A | 8/1999 | Brons et al. |
| 6,197,274 B1 | 3/2001 | Mahmud et al. |
| 6,210,564 B1 | 4/2001 | Brons et al. |
| 6,274,785 B1 | 8/2001 | Gore |
| 6,277,271 B1 | 8/2001 | Kocal |
| 6,402,940 B1 | 6/2002 | Rappas |
| 6,500,219 B1 | 12/2002 | Gunnerman |
| 6,558,533 B2 | 5/2003 | Schmidt et al. |
| 6,630,268 B2 | 10/2003 | Tosco et al. |
| 6,962,952 B2 | 11/2005 | Kawazoe et al. |
| 7,038,090 B1 | 5/2006 | Brandvold et al. |
| 7,144,499 B2 | 12/2006 | Han et al. |
| 7,144,943 B2 | 12/2006 | Kawazoe et al. |
| 7,179,368 B2 | 2/2007 | Rabion et al. |
| 7,192,516 B2 | 3/2007 | Schucker |
| 7,241,334 B2 | 7/2007 | Srinivas |
| 7,276,152 B2 | 10/2007 | Lin et al. |
| 7,291,259 B2 | 11/2007 | Gupta et al. |
| 7,314,545 B2 | 1/2008 | Karas et al. |
| 7,347,982 B2 * | 3/2008 | Denison .................. C09C 1/56 423/449.1 |
| 7,507,327 B2 | 3/2009 | Dysard et al. |
| 7,588,680 B1 | 9/2009 | Schucker |
| 7,968,635 B2 | 6/2011 | York et al. |
| 9,114,988 B2 | 8/2015 | Chavan et al. |
| 2001/0009654 A1 | 7/2001 | Kawazoe et al. |
| 2002/0022568 A1 | 2/2002 | Mackay et al. |
| 2002/0169242 A1 | 11/2002 | Kawazura |
| 2003/0029777 A1 | 2/2003 | Khare |
| 2003/0188993 A1 | 10/2003 | Khare et al. |
| 2004/0042955 A1 | 3/2004 | Srinivas |
| 2004/0109816 A1 | 6/2004 | Srinivas et al. |
| 2004/0119190 A1 | 6/2004 | Kawazoe et al. |
| 2005/0031528 A1 | 2/2005 | Niedermeier et al. |
| 2005/0040078 A1 | 2/2005 | Zinnen et al. |
| 2005/0145545 A1 | 7/2005 | Schucker |
| 2005/0189261 A1 | 9/2005 | Briot et al. |
| 2006/0022604 A1 | 2/2006 | Takeuchi et al. |
| 2006/0210564 A1 | 9/2006 | Kumagai et al. |
| 2006/0226049 A1 | 10/2006 | Nemeth et al. |
| 2006/0283780 A1 | 12/2006 | Spivey et al. |
| 2007/0105715 A1 | 5/2007 | Suda et al. |
| 2007/0227951 A1 | 10/2007 | Thirugnanasampanthar et al. |
| 2007/0295640 A1 | 12/2007 | Tan et al. |
| 2008/0308463 A1 | 12/2008 | Keckler et al. |
| 2009/0000990 A1 | 1/2009 | Toida |
| 2009/0081515 A1 | 3/2009 | Shibata et al. |
| 2009/0148374 A1 | 6/2009 | Choi |
| 2010/0264067 A1 | 10/2010 | Osaheni et al. |
| 2010/0278709 A1 | 11/2010 | Waller |
| 2010/0302326 A1 | 12/2010 | Morohoshi et al. |
| 2011/0147274 A1 | 6/2011 | Soto et al. |
| 2012/0153387 A1 | 6/2012 | Murthy et al. |
| 2014/0014557 A1 | 1/2014 | Chavan et al. |
| 2014/0290532 A1 | 10/2014 | Rodriguez et al. |

FOREIGN PATENT DOCUMENTS

| | | |
|---|---|---|
| CN | 1803939 A | 7/2006 |
| CN | 101391940 A | 3/2009 |
| CN | 101445458 A | 6/2009 |
| CN | 101481307 A | 7/2009 |
| CN | 103534337 A | 1/2014 |
| CN | 103635241 A | 3/2014 |
| CN | 104136551 A | 11/2014 |
| CN | 104334650 A | 2/2015 |
| CN | 104812481 A | 7/2015 |
| EP | 1637556 A1 | 3/2006 |
| EP | 2688984 A2 | 1/2014 |
| EP | 2696954 A2 | 2/2014 |
| EP | 2771414 A2 | 9/2014 |
| EP | 2831182 A2 | 2/2015 |
| EP | 2900370 A2 | 8/2015 |
| GB | 441703 A | 1/1936 |
| GB | 1478490 A | 6/1977 |
| HK | 1194421 | 11/2014 |
| HK | 1195753 | 11/2014 |
| ID | 2014/04195 | 10/2014 |
| ID | 2015/01697 | 4/2015 |
| ID | 2015/03171 | 7/2015 |
| IN | 845/MUM/2011 | 3/2014 |
| JP | 50-012871 | 2/1975 |
| JP | 50-014649 | 2/1975 |
| JP | 61-55283 | 3/1986 |
| JP | 2001-501239 A | 1/2001 |
| JP | 2001-354978 A | 12/2001 |
| JP | 2003-523470 A | 8/2003 |
| JP | 2003-528192 A | 9/2003 |
| JP | 2005-060697 A | 3/2005 |
| JP | 2005-307103 A | 11/2005 |
| JP | 2009-176513 A | 8/2009 |
| JP | 46-26402 B2 | 2/2011 |
| JP | 46-37761 B2 | 2/2011 |
| JP | 2012-012450 A | 1/2012 |
| JP | 2014-504453 A | 2/2014 |
| JP | 2014-517798 A | 7/2014 |
| JP | 2015-501361 A | 1/2015 |
| JP | 2015-514832 A | 5/2015 |
| MX | 2013012042 A | 5/2014 |
| MX | 2014004973 A | 5/2014 |
| MX | 2015003988 | 8/2015 |
| RU | 2013147201 U1 | 6/1994 |
| WO | WO-98/13428 A1 | 4/1998 |
| WO | WO-01/55245 | 8/2001 |
| WO | WO-01/70866 | 9/2001 |
| WO | WO-02/048041 A1 | 6/2002 |
| WO | WO-2005/028569 A2 | 3/2005 |
| WO | WO-2007/078416 A2 | 7/2007 |
| WO | WO-2008/056621 A1 | 5/2008 |
| WO | WO-2011/095986 A2 | 8/2011 |
| WO | WO-2012/127504 A2 | 9/2012 |
| WO | WO-2012/147097 A2 | 11/2012 |
| WO | WO-2012/175488 A2 | 12/2012 |
| WO | WO-2013/098838 A2 | 7/2013 |
| WO | WO-2014/049445 A2 | 4/2014 |

OTHER PUBLICATIONS

First Office Action issued on Dec. 28, 2105 by the State Intellectual Property Office of the People's Republic of China for Chinese Patent Application No. 2013800551012 (Inventor—Chavan et al.; Applicant—Aditya Birla Science & Technology Co. Ltd.; (only translation provided) (9 pages).

Final Office Action issued on Dec. 31, 2015 by the U.S. Patent and Trademark Office for U.S. Appl. No. 14/353,610, which was filed on Apr. 23, 2014 and published as US 2014/0290532 on Oct. 2, 2014 (Inventor—Rodriguez et al.; Applicant—Aditya Birla Science & Technology Co. Ltd.; (16 pages).

Anisimov, A.V. et al., Vanadium Peroxocomplexes as Oxidation Catalysts of Sulfur Organic Compounds by Hydrogen Peroxide in Bi-Phase Systems, Catal. Today, 78(3): 19-325 (2003).

(56) References Cited

OTHER PUBLICATIONS

Attar, A., Corcoran W. H., Desulfurization of organic sulfur compounds Regenerable and non regenerable oxygen carriers, Ind. Eng Chem Prod Res Dev, 17(2): 102-9 (1978).
Chen, L. Oxidative Desulfurization of Simulated Gasoline over Metal Oxide-loaded Molecular Sieve, Chin. J. Chem. Eng., 15(4): 520-523 (2007).
Collins, F.M. et al., Oxidative Desulphurisation of Oils Via Hydrogen Heteropolyanion Catalysis, J. Mol. Catal. A, 117(1-3): 397-403 (1997).
Dolbear, G. E., Skov E. R., Selective oxidation as a route to petroleum desulfurization, Am Chem Soc Div Pet Chem, 45: 375 (2000).
Filippis, P. et al., Oxidative Desulfurization: Oxidation Reactivity of Sulfur Compounds in Different Organic Mixes, Energy Fuels, 17(6): 1452-1455 (2003).
Garcia-Gutierrez, J.L. et al., Ultra-deep oxidative desulfurization of diesel fuel by the Mo/Al2O3-$H_2O_2$ system: The effect of system parameters on catalytic activity, Applied Catalysis A: General, 334: 366-373 (2008).
Hulea, V. et al., Mild Oxidation with H2O2 over Ti-Containing Molecular Sieves-A Very Efficient Method for Removing Aromatic Sulfur Compounds from Fuels, J. Catal., 198(2): 179-186 (2001).
Kong, L.Y. et al., Kinetics and Mechanism of Liquid-Phase Oxidation of Thiophene over TS-1 Using $H_2O_2$ Under Mild Conditions, Catal. Lett., 92(3-4): 163-167 (2004).
Second Office Action issued on Dec. 22, 2015 by the State Intellectual Property Office of the People's Republic of China for Chinese Patent Application No. 201480060806.9, which was filed on Oct. 23, 2012 and published as CN104136551 on Nov. 5, 2014 (3 pages).
Mei, H. et al., A new method for obtaining ultra-low sulfur diesel fuel via ultrasound assisted oxidative desulfurization, Fuel, 82(4): 405-414 (2003).
Murata, S. et al., A novel oxidative desulfurization system for diesel fuels with molecular oxygen in the presence of cobalt catalysts and aldehydes, Energy Fuel, 18(1): 116-121 (2004).
Murti, S.D.S. et al., Influences of Nitrogen Species on the Hydrodesulfurization Oil Over Sulfide Catalysts of Variable Activity, Appl. Catal. A: General, 252(2): 331-346 (2003).
Otsuki, S. et al., Oxidative Desulfurization of Light Gas Oil and Vacuum Gas Oil by Oxidation and Solvent Extraction, Energy Fuels, 14:1232-1239 (2000).
Palomeque, J. et al., Oxidation of Dibenzothiophene by Hydrogen Peroxide Catalyzed by Solid Bases, J. Catal., 211(1): 103-108 (2002).
Ramirez-Verduzco L. F. et al., Desulfurization of Middle Distillates by Oxidation and Extraction Process, Pet. Sci. Technol. 22(1-2): 129-139 (2004).
Ramirez-Verduzco, L.F. et al., Desulfurization of Diesel by Oxidation/Extraction Scheme: Influence of the Extraction Solvent, Catal. Today, 98(1-2): 289-294 (2004).
Shiraishi, Y. et al., Desulfurization and Denitrogenation Process for Light Oils Based on Chemical Oxidation followed by Liquid-Liquid Extraction, Ind. Eng. Chem. Res., 41(17): 4362-4375 (2002).
Shiraishi, Y. et al., Visible light-induced desulfurization process for catalytic cracked gasoline using an organic two-phase extraction system, Ind, Eng. Chem. Res., 38: 4538-4544 (1999).
Shiraishi, Y., Hirai, T., Desulfurization of Vacuum Gas Oil Based on Chemical Oxidation Followed by Liquid-Liquid Extraction, Energy Fuels, 18(1): 37-40 (2004).
Sun, G, & D. Xia, Effect of metallic salt to desulfurization of light oils, J. Fuel Chem. Technol., 29(6): 509-514 (2001).
Tam, P.S. et al., Desulfurization of fuel oil by oxidation and extraction. 1. Enhancement of extraction oil yield, Ind. Eng. Chem. Res., 29: 321-324 (1990).
Tam, P.S. et al., Desulfurization of fuel oil by oxidation and extraction. 2. Kinetic Modeling of oxidation reaction, Ind. Eng. Chem. Res., 29(3): 324-329 (1990).
Te, M. et al., Oxidation reactivities of dibenzothiophenes in polyoxometalate/$H_2O_2$ and formic acid/$H_2O_2$ systems, Appl. Catal. A Gen., 219: 267-280 (2001).

Wang, D. et al., Oxidative desulfurization of fuel oil: Part I. Oxidation of dibenzothiophenes using tert-butyl hydroperoxide, Appl Catal A: Gen, 253(1): 91-99 (2003).
Yazu, K. et al., Oxidation of Dibenzothiophenes in an Organic Biphase System and Its Application to Oxidative Desulfurization of Light Oil, Energ. Fuels, 15(6): 1535-1536 (2001).
Yi, G.H. et al., Oxidative Dehydrogenation of Ethane Over $LA_{1-x}Sr_xFeO_{3-\delta}$ Perovskite Oxides, Catalysts Letters, 38(3-4): 189-195 (1996).
Yu, G. et al., Diesel fuel desulfurization with hydrogen peroxide promoted by formic acid and catalyzed by activated carbon, Carbon, 43(11): 2285-2294 (2005).
Zannikos F. et al., Desulfurization of petroleum fractions by oxidation and solvent extraction, Fuel Process Technol. 42(1): 35-45 (1995).
Zapata, B. et al., Catalyst Screening for Oxidative Desulfurization Using Hydrogen Peroxide, Catalysis Today, 106: 219-221 (2005).
Office Action issued Dec. 22, 2014 by the Canadian Intellectual Property Office for Canadian Patent Application No. 2,830,881, which was filed Mar. 20, 2012 (Inventor—Chavan et al.; Applicant—Aditya Birla Science & Technology Co. Ltd.) (4 pages).
Response to Office Action issued Dec. 22, 2014 by the Canadian Intellectual Property Office for Canadian Patent Application No. 2,830,881, which was filed on Mar. 20, 2012 (Inventor—Chavan et al.; Applicant—Aditya Birla Science & Technology Co. Ltd.) (4 pages).
Office Action issued Aug. 12, 2015 by the Candian Intellectual Property Office for Canadian Patent Application No. 2,830,881, which was filed on Mar. 20, 2012 (Inventor—Chavan et al.; Applicant—Aditya Birla Science & Technology Co. Ltd.) (3 pages).
First Office Action issued on Sep. 1, 2014 by the State Intellectual Property Office of the People's Republic of China for Chinese Patent Application No. 201280014637.5, which was filed on Mar. 20, 2012 and published as CN103534337 on Jan. 22, 2014 (Inventor—Chavan et al.; Applicant—Aditya Birla Science & Technology Co. Ltd.) (10 pages).
Second Office Action issued on Jun. 18, 2015 by the State Intellectual Property Office of the People's Republic of China for Chinese Patent Application No. 201280014637.5, which was filed on Mar. 20, 2012 and published as CN103534337 on Jan. 22, 2014 (Inventor—Chavan et al.; Applicant—Aditya Birla Science & Technology Co. Ltd.) (9 pages).
Supplementary European Search Report and Opinion issued on Jul. 31, 2014 for European Patent Application No. 12760070.8, which was filed on Mar. 20, 2012 and published as 2688984 on Jan. 29, 2014 (Inventor—Chavan et al.; Applicant—Aditya Birla Science & Technology Co. Ltd.) (6 pages).
First Office Action issued on Oct. 29, 2014 by the Japanese Patent Office for Japanese Patent Application No. 2014-500543, which was filed on Mar. 20, 2012 (Inventor—Chavan et al.; Applicant—Aditya Birla Science & Technology Co. Ltd.) (12 pages).
International Search Report and Written Opinion mailed on Oct. 18, 2012 by the International Searching Authority for International Application No. PCT/IN2012/000188, which was filed on and published as WO 2012/127504 on Sep. 27, 2012 (Inventor—Chavan et al.; Applicant—Aditya Birla Science & Technology Co. Ltd.) (9 pages).
International Preliminary Report on Patentability issued on Sep. 24, 2013 by the International Searching Authority for International Application No. PCT/IN2012/000188, which was filed on and published as WO 2012/127504 on Sep. 27, 2012 (Inventor—Chavan et al.; Applicant—Aditya Birla Science & Technology Co. Ltd.) (5 pages).
Office Action issued on Oct. 23, 2014 by the Patent Office of the Russian Federation for Russian Patent Application No. 2013147201, which was filed on Mar. 20, 2012 and published as 12 on Apr. 27, 2014 (Inventor—Chavan et al.; Applicant—Aditya Birla Science & Technology Co. Ltd.) (3 pages).
Preliminary Amendment filed on Sep. 23, 2013 U.S. Appl. No. 14/006,803, which was filed on Sep. 23, 2013 and published as US 2014/0014557 on Jan. 16, 2014 (Inventor—Chavan et al.; Applicant—Aditya Birla Science & Technology Co. Ltd.) (3 pages).

(56) References Cited

OTHER PUBLICATIONS

Non-Final Office Action issued on May 23, 2014 by the U.S. Patent and Trademark Office for U.S. Appl. No. 14/006,803, which was filed on Sep. 23, 2013 and published as U.S. Appl. No. 2014/0014557 on Jan. 16, 2014 (Inventor—Chavan et al.; Applicant—Aditya Birla Science & Technology Co. Ltd.) (11 pages).
Response to Non-Final Office Action filed on Nov. 24, 2014 with the U.S. Patent and Trademark Office for U.S. Appl. No. 14/006,803, which was filed on Sep. 23, 2013 and published as US 2014/0014557 on Jan. 16, 2014 (Inventor—Chavan et al.; Applicant—Aditya Birla Science & Technology Co. Ltd.) (8 pages).
Final Office Action issued on Mar. 13, 2015 by the U.S. Patent and Trademark Office for U.S. Appl. No. 14/006,803, which was filed on Sep. 23, 2013 and published as US 2014/0014557 on Jan. 16, 2014 (Inventor—Chavan et al.; Applicant—Aditya Birla Science & Technology Co. Ltd.) (10 pages).
Response After Final Office Action filed on Sep. 14, 2015 with by the U.S. Patent and Trademark Office for U.S. Appl. No. 14/006,803, which was filed on Sep. 23, 2013 and published as US 2014/0014557 on Jan. 16, 2014 (Inventor—Chavan et al.; Applicant—Aditya Birla Science & Technology Co. Ltd.) (10 pages).
Office Action issued on Mar. 12, 2015 by the Canadian Intellectual Property Office for Canadian Patent Application No. 2833208, which was filed on Apr. 12, 2012 (Inventor—Chavan et al.; Applicant—Aditya Birla Science & Technology Co. Ltd.) (3 pages).
First Office Action issued on Sep. 3, 2014 by the State Intellectual Property Office of the People's Republic of China for Chinese Patent Application No. 201280018300.1, which was filed on Apr. 12, 2012 and published as CN103635241 on Mar. 12, 2014 (Inventor—Chavan et al.; Applicant—Aditya Birla Science & Technology Co. Ltd.) (12 pages).
Second Office Action issued on Jul. 15, 2015 by the State Intellectual Property Office of the People's Republic of China for Chinese Patent Application No. 201280018300.1, which was filed on Apr. 12, 2012 and published as CN103635241 on Mar. 12, 2014 (Inventor—Chavan et al.; Applicant—Aditya Birla Science & Technology Co. Ltd.) (13 pages).
Supplementary European Search Report and Opinion issued on Dec. 1, 2014 for European Patent Application No. 12777572.4, which was filed on Apr. 12, 2012 and published as 2696954 on Feb. 19, 2014 (Inventor—Chavan et al.; Applicant—Aditya Birla Science & Technology Co. Ltd.) (4 pages).
Office Action issued on Feb. 12, 2015 by the Japanese Patent Office for Japanese Patent Application No. 2014-504453, which was filed on Apr. 12, 2012 and published as 2014-517798 on Jul. 24, 2014 (Inventor—Chavan et al.; Applicant—Aditya Birla Science & Technology Co. Ltd.) (5 Pages).
Decision to Grant issued on Sep. 9, 2015 by the Japanese Patent Office for Japanese Patent Application No. 2014-504453, which was filed on Apr. 12, 2012 and published as 2014-517798 on Jul. 24, 2014 (Inventor—Chavan et al.; Applicant—Aditya Birla Science & Technology Co. Ltd.) (3 Pages).
International Search Report and Written Opinion mailed on Dec. 20, 2012 by the by the International Searching Authority for International Patent Applicant No. PCT/IN2012/000263, which was filed on Apr. 12, 2012 and published as WO 2012/147097 on Nov. 1, 2012 (Inventor—Chavan et al.; Applicant—Aditya Birla Science & Technology Co. Ltd.) (8 pages).
International Preliminary Report on Patentability issued on Oct. 15, 2013 by the International Searching Authority for International Patent Application No. PCT/IN2012/000263, which was filed on Apr. 12, 2012 and published as WO 2012/147097 on Nov. 1, 2012 (Inventor—Chavan et al.; Applicant—Aditya Birla Science & Technology Co. Ltd.) (5 pages).
Office Action issued on Dec. 23, 2014 by the Patent Office of the Russia Federation for Russian Patent Application No. 2013150805, which was filed on Apr. 12, 2012 (Inventor—Chavan et al.; Applicant—Aditya Birla Science & Technology Co. Ltd.) (2 pages).
Preliminary Amendment filed on Oct. 10, 2013 with the U.S. Patent and Trademark Office for U.S. Appl. No. 14/111,048, which was filed on Apr. 12, 2012 and issued as 9,114,988 on Aug. 25, 2015 (Inventor—Chavan et al.; Applicant—Aditya Birla Science & Technology Co. Ltd.) (5 pages).
Notice of Allowance issued on Jun. 2, 2014 by the U.S. Patent and Trademark Office for U.S. Appl. No. 14/111,048, which was filed on Apr. 12, 2012 and issued as 9,114,988 on Aug. 25, 2015 (Inventor—Chavan et al.; Applicant—Aditya Birla Science & Technology Co. Ltd.) (8 pages).
Non-Final Office Action issued on Sep. 11, 2014 by the U.S. Patent and Trademark Office for U.S. Appl. No. 14/111,048, which was filed on Apr. 12, 2012 and issued as 9,114,988 on Aug. 25, 2015 (Inventor—Chavan et al.; Applicant—Aditya Birla Science & Technology Co. Ltd.) (6 pages).
Response to Non-Final Office Action filed on Dec. 11, 2014 wit the U.S. Patent and Trademark Office for U.S. Appl. No. 14/111,048, which was filed on Apr. 12, 2012 and issued as 9,114,988 on Aug. 25, 2015 (Inventor—Chavan et al.; Applicant—Aditya Birla Science & Technology Co. Ltd.) (3 pages).
Notice of Allowance issued on Dec. 24, 2014 by the U.S. Patent and Trademark Office for U.S. Appl. No. 14/111,048, which was filed on Apr. 12, 2012 and issued as 9,114,988 on Aug. 25, 2015 (Inventor—Chavan et al.; Applicant—Aditya Birla Science & Technology Co. Ltd.) (7 pages).
Notice of Allowance issued on Mar. 31, 2015 by the U.S. Patent and Trademark Office for U.S. Appl. No. 14/111,048, which was filed on Apr. 12, 2012 and issued as 9,114,988 on Aug. 25, 2015 (Inventor—Chavan et al.; Applicant—Aditya Birla Science & Technology Co. Ltd.) (9 pages).
Issue Notification issued on Aug. 25, 2015 by the U.S. Patent and Trademark Office for U.S. Appl. No. 14/111,048, which was filed on Apr. 12, 2012 and issued as 9,114,988 on Aug. 25, 2015 (Inventor—Chavan et al.; Applicant—Aditya Birla Science & Technology Co. Ltd.) (1 page).
International Search Report and Written Opinion mailed on Mar. 20, 2014 by the International Searching Authority for International Patent Application No. PCT/IB2013/002825, which was filed on Sep. 27, 2013 and published as WO 2014/049445 on Apr. 3, 2014 (Inventor—Chavan et al.; Applicant—Aditya Birla Science & Technology Co. Ltd.) (11 pages).
International Preliminary Report on Patentability issued on Mar. 3, 2015 by the International Searching Authority for International Patent Application No. PCT/IB2013/002825, which was filed on Sep. 27, 2013 and published as WO 2014/049445 on Apr. 3, 2014 (Inventor—Chavan et al.; Applicant—Aditya Birla Science & Technology Co. Ltd.) (8 pages).
Preliminary Amendment filed on Mar. 30, 2015 with the U.S. Patent and Trademark Office for U.S. Appl. No. 14/432,342, which was filed on Mar. 30, 2015 (Inventor—Chavan et al.; Applicant—Aditya Birla Science & Technology Co. Ltd.) (6 pages).
First Office Action issued on May 14, 2015 by the State Intellectual Property Office of the People's Republic of China for Chinese Patent Application No. 201280060806.9, which was filed on Oct. 23, 2012 and published as CN104136551 on Nov. 5, 2014 (Inventor—Rodriguez et al.; Applicant—Aditya Birla Science and Technology Co. Ltd.) (only translation provided) (8 pages).
Supplementary European Search Report and Opinion issued on Jul. 31, 2015 for European Patent Application No. 12862639.7, which was filed on Oct. 23, 2012 and published as 2771414 on Sep. 3, 2014 (Inventor—Rodriguez et al.; Applicant—Aditya Birla Science & Technology Co. Ltd.) (2 pages).
Office Action issued on Jun. 24, 2015 by the Japanese Patent Office for Japanese Patent Application No. 2014-537813, which was filed on Oct. 23, 2012 and published as 2015-501361 on Jan. 15, 2015 (Inventor—Rodriguez et al.; Applicant—Aditya Birla Science & Technology Co. Ltd.) (6 pages).
International Search Report and Written Opinion mailed on Jun. 19, 2013 by the International Searching Authority for International Patent Application No. PCT/IN2012/000698, which was filed on Oct. 23, 2012 and published as WO 2013/098838 on Jul. 4, 2013 (Inventor—Rodriguez et al.; Applicant—Aditya Birla Science & Technology Co. Ltd.) (7 pages).
International Preliminary Report on Patentability issued on Apr. 29, 2014 by the by the International Searching Authority for Interna-

(56) References Cited

OTHER PUBLICATIONS tional Patent Application No. PCT/IN2012/000698, which was filed on Oct. 23, 2012 and published as WO 2013/098838 on Jul. 4, 2013 (Inventor—Rodriguez et al.; Applicant—Aditya Birla Science & Technology Co. Ltd.) (5 pages).

Office Action issued on Jun. 17, 2015 by the Patent Office of the Russian Federation for Russian Patent Application No. 2014121026, which was filed on Oct. 23, 2012 (Inventor—Rodriguez et al.; Applicant—Aditya Birla Science & Technology Co. Ltd.) (2 pages).

Non-Final Office Action issued on Mar. 26, 2015 by the U.S. Patent and Trademark Office for U.S. Appl. No. 14/353,610, filed Apr. 23, 2013 and published as US 2014/0290532 on Oct. 2, 2014 (Inventor—Rodriguez et al.; Applicant—Aditya Birla Science & Technology Co. Ltd.) (11 pages).

First Office Action issued on Jul. 27, 2015 by the State Intellectual Property Office of the People's Republic of China for Chinese Patent Application No. 201380020228.0, which was filed on Mar. 28, 2013 and published as CN104334650 on Feb. 4, 2015 (Inventor—Chavan et al.; Applicant—Aditya Birla Science & Technology Co. Ltd.) (only translation provided) (9 pages).

International Search Report and Written Opinion mailed on Jan. 14, 2014 by the International Searching Authority for International Patent Application No. PCT/IN2013/000208, which was filed on Mar. 28, 2013 and published as WO 2013/175488 on Nov. 28, 2013 (Inventor—Chavan et al.; Applicant—Aditya Birla Science & Technology Co. Ltd.) (8 pages).

International Preliminary Report on Patentability issued Oct. 1, 2014 by the International Searching Authority for International Patent Application No. PCT/IN2013/000208, which was filed on Mar. 28, 2013 and published as WO 2013/175488 on Nov. 28, 2013 (Inventor—Chavan et al.; Applicant—Aditya Birla Science & Technology Co. Ltd.) (8 pages).

First Office Action issued on Dec. 28, 2015 by the State Intellectual Property Office of the People's Republic of China for Chinese Patent Application No. 2013800551012 (Inventor—Chavan et al.; Applicant—Aditya Birla Science & Technology Co. Ltd.) (only translation provided) (9 pages).

\* cited by examiner

PROCESS FOR OBTAINING CARBON BLACK POWDER WITH REDUCED SULFUR CONTENT

CROSS-REFERENCE TO RELATED APPLICATIONS

The present application is a U.S. National Phase Application of International Application No. PCT/IN2013/000208, filed Mar. 28, 2013, which claims priority to Indian Patent Application No. 1018/MUM/2012, filed Mar. 30, 2012, all of which applications are incorporated herein fully by this reference

FIELD OF THE DISCLOSURE

The present disclosure relates to process for preparing carbon black powders.

More, particularly the disclosure relates to a process for obtaining carbon black powder with low sulfur content.

BACKGROUND

Carbon Black is a finely divided form of carbon, produced by the incomplete combustion of heavy petroleum products such as FCC tar, coal tar, ethylene cracking tar and in small quantities from vegetable oil. It is essentially composed of elemental carbon in the form of semispherical, colloidal particles coalesced into each other and forming mainly particle aggregates. Carbon black is a form of amorphous carbon that has a high surface area to volume ratio. The Carbon Black (CB) powders have a variety of applications ranging from tires to electrodes, pigments, cosmetics, plastics, paints etc. However, the grade of the powder required in each of these applications is different in terms of structure and composition. One of the primary requisite for specialty applications is the high purity of Carbon black powders in terms of Sulfur content as well as other metal ion contamination. One of the inherent problems with the Carbon Black manufacturing is the overall sulfur content in the raw materials which not only creates environmental hazards during the combustion processes of oils but also gets carried with the final Carbon Black powders. The presence of sulfur in the final product is detrimental to the quality especially for specialty applications. The Carbon Black Feedstock or Carbon Black raw material typically contains about 1-4% sulfur. About 40% of this sulfur gets retained into the final Carbon Black product during the manufacturing processes amounting to about 1.0 to 1.5% sulfur. This high sulfur impurity is detrimental for applications particularly as pigments, industrial electrodes, base coats, conductive coatings etc. In the insulating plastics industry, there is a need for low sulfur containing carbon black to enhance the insulating capability of the substance and make its surface more uniform. Essentially, the sulfur content required is less than 0.75% as per industry standards.

The prior art discloses various methods for sulfur removal such as hydro-desulfurization, adsorption, solvent extraction, bioenzymatic treatment, oxidation etc. However, these processes are applicable towards sulfur removal of petrochemical oils and liquid fuels in general.

The process for sulfur removal from petroleum oils is based on treatment of the oil by an alkali metal, especially sodium metal as the desulfurizing agent. In this process, the sulfur is primarily removed as a metal sulfide instead of the removal of the entire sulfur containing molecule. The sodium metal is generally used as pure metal or as an alloy, supported on inert species, or as dissolved in ammonia. In some processes, other sodium-based, compounds such as NaHS, $NaNH_2$ are used for the desulfurization. However, these sodium-based desulfurization processes are associated with limitations such as low yield of desulphurized feed oil, formation of large amount of insoluble sludge, requirement of hydrogen and safety concerns. The inherent high viscosity of heavy oils and petroleum residues makes it difficult for the processing and separation operations before and after the desulphurization process. Thus, there is a substantial loss of feed oil during the process, especially during filtration or separation. Also, many of the sodium metal based processes for oil treatment use hydrogen at high pressures in combination to the sodium metal for desulfurization.

The above mentioned processes in literature for reducing the sulfur content are targeted at crude oils or for heavy oil up gradation. However, none of these processes have been attempted for desulfurization of solids materials such as Carbon Black powders. The removal of sulfur from solid powder materials such as Carbon black using sodium based desulfurization is hitherto unexplored.

Therefore, there is felt a need to develop a process for reducing sulfur from carbon black powder using sodium based desulfurization technology.

OBJECTS

Some of the objects of the present disclosure, which at least one embodiment herein satisfies, are as follows:

It is an object of the present disclosure to provide a feasible process for obtaining carbon black powder with sulfur content less than 0.07%.

Another object of the present disclosure is to provide a process for obtaining carbon black powder with sulfur content less than 0.07%, wherein the process is carried out in the absence of hydrogen and external pressure conditions.

SUMMARY

In accordance with the present disclosure there is provided a process for obtaining carbon black powder with a sulfur content of less than 0.07%, said process comprising:
  reacting, at a predetermined temperature and pressure, carbon black powder having sulfur content in the range of 1-2% with an alkali metal or salt thereof, in a fluid media, to form a rented mixture containing alkali sulfide derivative and carbon black powder with a sulfur content of less than 0.07%; and
  isolating alkali sulfide derivative from said mixture to obtain carbon black powder with a sulfur content of less than 0.07%.

In a preferred embodiment of the present disclosure, alkali metal or salt thereof is dispersed in the fluid media, prior to reacting with the carbon black powder.

Typically, the reaction is carried out under continuous stirring.

Typically, the alkali metal is a sodium metal.

Typically, the alkali salt is sodium hydroxide.

Typically, the fluid media consists of at least one compound selected from the group consisting of toluene, xylene, hexane, heptane, petrol, kerosene, crude oil, residual oil, ammonia, hydrogen gas and nitrogen gas.

Typically, the fluid media consists of xylene.

Typically, the pre-determined pressure is in the range of 10 psig to 500 psig, more preferably 14 psig to 50 psig.

Typically, the pre-determined temperature is in the range of 50° C. to 500° C., more preferably 250° C. to 350° C.

Typically, the alkali sulfide derivative is isolated from said mixture by treating said mixture with water at a temperature in the range of 30° C. to 100° C.

DETAILED DESCRIPTION

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The description herein after, of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The term "fluid media" as disclosed in the present disclosure defines a medium, which is either a liquid, gas or mixture of both, for carrying out the process as disclosed herein.

The present disclosure provides a process for reducing sulfur from Carbon Black powder, so as to enhance the quality and applicability of the powder. The process involves contacting carbon black powder having a sulfur content of 1 to 2% with an alkali metal or salt thereof, in a fluid media, to form a dispersion and further heating the dispersion to a temperature in the range of 250-350° C. The sulfur in the carbon black reacts with the alkali metal to form an alkali sulfide salt. The alkali sulfide salt can then be removed from the system by means of dissolution of the salt in water. The process is carried out in an autoclave and under vigorous stirring.

The process of the present disclosure may be used to reduce sulphur content in Carbon nano-tubes, Carbon fibres, Graphite, Activated Carbon and Coke.

The present disclosure describes the development of sodium metal based technology for sulfur reduction of the Carbon Black powder (eg: Grade N234).

The fluid can be liquid, gas, or a mixture of liquid and gas. The liquid could be any organic based solvent which has affinity towards Carbon Black. It may be noted that Carbon Black powders are highly hydrophobic and hence low polarity solvents such as Xylene, Toluene, hexane, heptane, or mixed petroleum oils such as Petrol, Kerosene, Crude Oil, Residual Oils, liquid ammonia etc. can be used. The gas could be ammonia, hydrogen or nitrogen gas.

In the present disclosure, fluid media consists of at least one compound selected from the group consisting of toluene, xylene, hexane, heptane, petrol, kerosene, crude oil, residual oil, ammonia, hydrogen gas and nitrogen gas.

In one embodiment of the present disclosure, the process is carried out by dispersing Carbon Black powder in a fluid media, adding alkali metal in the form solid pieces to the fluid media, and reacting carbon black powder with the alkali metal in fluid media at a temperature in the range of 100-400° C., preferably in the temperature 250-350° C., more preferably in the range 250-325° C. and under pressure in the of range of 10 to 500 psig, preferably 10-30 psig, more preferably in the range of 14-20 psig.

In another embodiment of the present disclosure, the process is carried out by dispersing alkali metal or salt thereof in a fluid media to form a dispersion, adding carbon black powder to the dispersion, and reacting carbon black powder with the dispersed alkali metal in the fluid media at a temperature in the range of 100-400° C., preferably in the temperature 250-350° C., more preferably in the range 250-325° C. and under pressure in the of range of 10 to 500 psig, preferably 10-30 psig, more preferably in the range of 14-20 psig.

In still another embodiment of the present disclosure, the process for sulfur removal from Carbon Black powder is carried out by reacting carbon black powder with an alkali salt such as sodium hydroxide. The process involves dissolving sodium hydroxide in water to form an alkali solution, adding the solution to the dispersion of the Carbon Black in a fluid media and reacting the carbon black powder with the alkali salt solution, in the fluid media at a temperature in the range of 100-400° C., preferably in the temperature 250-350° C., more preferably in the range 250-325° C. and under pressure in the of range of 10 to 500 psig, preferably 10-30 psig, more preferably in the range of 14-20 psig.

In still another embodiment of the present disclosure, the process involves reacting carbon black powder having a sulfur content of 1 to 2% with an alkali metal or salt thereof, in a fluid media, at a temperature in the range of 250-300° C., under pressure in the of range of 10 to 500 psig, preferably 200-300 psig, in the presence of hydrogen.

The disclosure is further illustrated with the help of the following examples which should not be construed to limit the disclosure in any way.

Example-1

About 10 gm of Carbon black powder was added to 400 ml xylene in a 1 liter high pressure Parr reactor, to form dispersion. 0.5 gm of sodium metal in form of small pieces was added to the dispersion. The system was then pressurized with 100 psig of hydrogen. The system was kept under constant stirring (600-800 rpm) and heated to temperature of 300° C. for 3 hours. After the residence time of 3 hours, the system was cooled, the reacted mixture was filtered and washed with water at a temperature of 50 to 100° C. for 3 hours, to remove sodium sulfide ($Na_2S$) present in the mixture to yield desulfurized Carbon Black powder. The powder was dried and analyzed for sulfur content by CHNS analysis. The initial sulfur content of the powder was about 1.25%. The net sulfur content after the process was to 0.83%, thus indicating a desulfurization of about 34%.

Example 2

About 10 gm of Carbon black powder was added to 400 ml xylene in a 1 liter high pressure Parr reactor to form a dispersion. 2 gm of sodium metal pieces was added to the dispersion. After sodium addition, the system was pressurized with 100 psig of hydrogen. The system was then kept under constant stirring (600-800 rpm) and heated to temperature of 300° C. for 3 hours. After the residence time of 3 hours, the system was cooled, the reacted mixture was filtered and washed with water at a temperature of 50 to 100° C. for 3 hours, to remove sodium sulfide (Na₂S) present in the mixture to yield desulfurized Carbon Black powder. The powder was dried and analyzed for sulfur content by CHNS analysis. The initial sulfur content of the powder was about 1.25%. The net sulfur content after the process was to 0.43%. The desulfurization in example-2 was about 65%, due to larger amounts of sodium used.

Example-3

About 2 gm sodium metal was first dispersed in 400 ml xylene. Carbon black powder (10 gm) was then added to the dispersion in the pressure reactor. The system was then purged with hydrogen of about 200 psig. The system was then kept under constant stirring (600-800 rpm) and heated to temperature of 300° C. for 3 hours. After the residence time of 3 hours, the system was cooled down, the reacted mixture was filtered and washed with water at a temperature of 50 to 100° C. for 3 hours, to remove sodium sulfide (Na₂S) present in the mixture yield purified Carbon Black powder. The net sulfur content in the purified carbon black powder after the process was to 0.054%. The desulfurization was about 96%, probably due to use of sodium-xylene dispersion and higher pressure.

Example-4

About 1 gm sodium metal was first dispersed in xylene 400 ml. Carbon black powder (10 gm) was then added to the dispersion in the pressure reactor. The reaction was carried out at atmospheric pressure. The system was then kept under constant stirring (600-800 rpm) and heated to temperature of 300° C. for 1 hour. After the residence time of 1 hour, the system was cooled, the reacted mixture was filtered and washed with water at a temperature of 50 to 100° C. for 3 hours, to remove sodium sulfide (Na₂S) present in the mixture to yield purified Carbon Black powder. The net sulfur content after the process was to 0.045%. It was observed desulfurization was 96%. This indicated that the process works well even in the absence of hydrogen and any external pressure conditions.

Example 5

About 0.5 gm sodium metal was first dispersed in xylene 400 ml. Carbon black powder (10 gm) was then added to the dispersion in the pressure reactor. The reaction was carried out at atmospheric pressure. The system was then kept under constant stirring (600-800 rpm) and heated to temperature of 300° C. for 3 hours. After the residence time of 3 hour, the system was cooled down, the reacted mixture was filtered and washed with water at a temperature of 50 to 100° C. for 3 hours, to remove sodium sulfide (Na₂S) present in the mixture to yield purified Carbon Black powder. The net sulfur content after the process was to 0.16%. It was observed desulfurization was 87%.

Example-6

About 4 gm of sodium hydroxide was dissolved in water (200 ml), the solution was then added to carbon black powder dispersed in xylene (10 gm in 400 ml) in the pressure reactor. The reaction was carried out at atmospheric pressure. The system was then kept under constant stirring (600-800 rpm) and heated to temperature of 300° C. for 2 hours. After the residence time of 2 hours, the system was cooled, the reacted mixture was filtered and washed with water at a temperature of 50 to 100° C. for 3 hours, to remove sodium sulfide (Na₂S) present in the mixture to yield purified Carbon Black powder. It was observed that a desulfurization of about 64% was achieved.

The above experimental details are tabulated in table-1

TABLE 1

| Example | Na amount (g) | Temperature (° C.) | Time | RPM | % S | % Desulfurization | H₂ (psi) |
|---|---|---|---|---|---|---|---|
|  | 0 | 0 | 0 | 0 | 1.25 | — | 0 |
| 1. | 0.5 | 300 | 3 h | 600 | 0.83 | 33.6 | 100 |
| 2. | 2 | 300 | 3 h | 600 | 0.43 | 65.6 | 100 |
| 3 | 2 | 300 | 3 h | 800 | 0.054 | 95.6 | 200 |
| 4 | 1 | 300 | 1 h | 600 | 0.045 | 96.4 | 0 |
| 5 | 0.5 | 300 | 3 h | 600 | 0.16 | 87.2 | 0 |
| 6 | 4 g NaOH | 300 | 2 h | 600 | 0.44 | 64.8 | 0 |

From the above experimental details, it is clear that high percentage of desulfurization is obtained when the process is carried out using alkali dispersion, as in Example 4.

Also, the process in accordance with the present disclosure as in Example 4 is capable of reducing the sulfur content of the carbon black powder to less than 0.07% in the absence of hydrogen or any additional pressure conditions.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the invention to achieve one or more of the desired objects or results.

Any discussion of documents, acts, materials, devices, articles or the like that has been included in this specification is solely for the purpose of providing a context for the invention. It is not to be taken as an admission that any or all of these matters form part of the prior art base or were common general knowledge in the field relevant to the invention as it existed anywhere before the priority date of this application.

While considerable emphasis has been placed herein on the specific steps of the preferred process, it will be appreciated that many steps can be made and that many changes can be made in the preferred steps without departing from the principles of the disclosure. These and other changes in the preferred steps of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for obtaining carbon black powder with a sulfur content of less than 0.07%, the process comprising:
    reacting, at a predetermined temperature and pressure, a carbon black powder having a sulfur content in the range of 1-2% with an alkali metal or salt thereof, in a fluid media, to form a reacted mixture containing an alkali sulfide derivative and a carbon black powder with a sulfur content of less than 0.07%; and
    isolating the alkali sulfide derivative from the mixture to obtain the carbon black powder with a sulfur content of less than 0.07%.

2. The process of claim 1, wherein the alkali metal or salt thereof is dispersed in the fluid media, prior to reacting with the carbon black powder.

3. The process of claim 1, wherein the reaction is carried out under continuous stirring.

4. The process of claim 1, wherein the alkali metal or salt thereof is a sodium metal.

5. The process of claim 1, wherein the alkali metal or salt thereof is sodium hydroxide.

6. The process of claim 1, wherein the fluid media comprises at least one compound selected from the group consisting of toluene, xylene, hexane, heptane, petrol, kerosene, crude oil, residual oil, ammonia, hydrogen gas, and nitrogen gas.

7. The process of claim 1, wherein the fluid media comprises xylene.

8. The process of claim 1, wherein the pre-determined pressure is in the range of 10 psig to 500 psig.

9. The process of claim 1, wherein the pre-determined pressure is in the range of 14 psig to 50 psig.

10. The process of claim 1, wherein the pre-determined temperature is in the range of 50° C. to 500° C.

11. The process of claim 1, wherein the pre-determined temperature is in the range of 250° C. to 350° C.

12. The process of claim 1, wherein the alkali sulfide derivative is isolated from the mixture by treating the mixture with water at a temperature in the range of 30° C. to 100° C.

* * * * *